United States Patent [19]

Bott

[11] Patent Number: 4,673,119
[45] Date of Patent: Jun. 16, 1987

[54] VEHICLE LUGGAGE CARRIER

[76] Inventor: John A. Bott, 931 Lake Shore Dr., Grosse Pointe Shores, Mich. 48236

[21] Appl. No.: 708,360

[22] Filed: Mar. 4, 1985

[51] Int. Cl.<sup>4</sup> ............................................... B60R 9/04
[52] U.S. Cl. ...................................... 224/326; 224/309
[58] Field of Search ....................... 224/326, 321, 325; 403/192, 199, 231, 263

[56] References Cited

U.S. PATENT DOCUMENTS

| | | |
|---|---|---|
| Re. 26,538 | 3/1969 | Bott . |
| Re. 26,539 | 3/1969 | Bott . |
| 2,498,590 | 2/1950 | Straus ............................ 403/199 X |
| 3,253,755 | 5/1966 | Bott ............................... 224/326 X |
| 3,325,067 | 6/1967 | Helm .............................. 224/326 X |
| 3,330,454 | 7/1967 | Bott ............................... 224/326 X |
| 3,451,602 | 6/1969 | Bott . |
| 3,519,178 | 7/1970 | Helm et al. ..................... 224/326 X |
| 3,519,180 | 7/1970 | Bott . |
| 3,840,250 | 10/1974 | Bott . |
| 3,853,254 | 12/1974 | Helm . |
| 4,156,497 | 5/1979 | Bott . |
| 4,162,755 | 7/1979 | Bott . |
| 4,175,682 | 11/1979 | Bott . |
| 4,270,872 | 6/1981 | Kiyosawa ...................... 403/263 X |
| 4,274,570 | 6/1981 | Bott . |
| 4,279,368 | 7/1981 | Kowalski ........................... 224/326 |
| 4,341,332 | 7/1982 | Kowalski et al. .................. 224/326 |
| 4,342,411 | 8/1982 | Bott . |
| 4,428,517 | 1/1984 | Bott .................................. 224/326 |
| 4,448,337 | 5/1984 | Cronce ......................... 224/326 X |

Primary Examiner—Stephen Marcus
Assistant Examiner—Robert M. Petrik
Attorney, Agent, or Firm—Harness, Dickey & Pierce

[57] ABSTRACT

A luggage rack for an automobile having a horizontally disposed exterior body surface comprising a pair of elevated side members, at least one stanchion disposed at one end of each of the side members and associated with the side members, the stanchions each having an aperture into which an end support member of a cross member is disposed wherein a fastener secures the cross member to the stanchion via the end support. A cover conceals the fastener and may also conceal the fasteners that secure the stanchion to the automobile.

7 Claims, 7 Drawing Figures

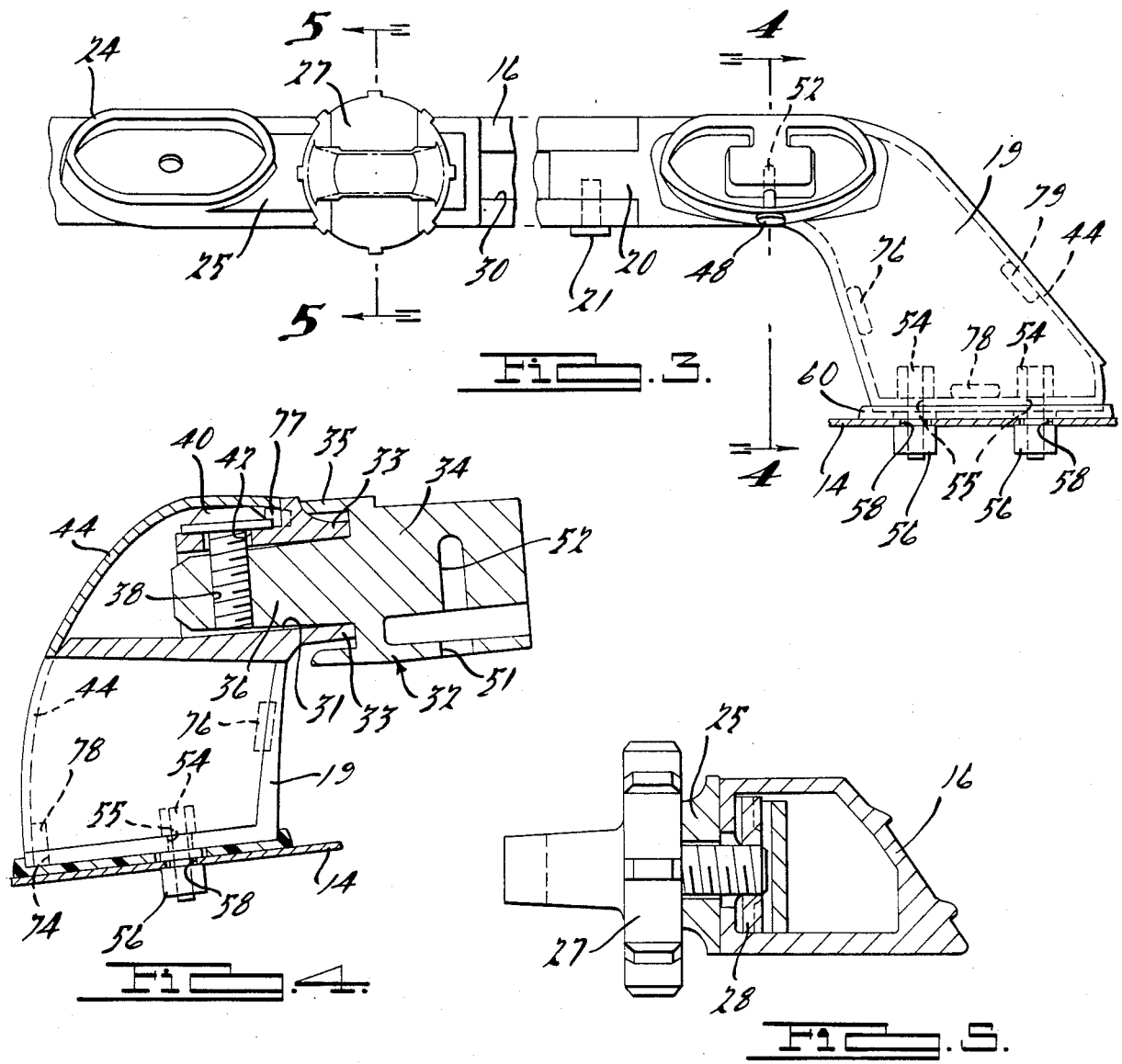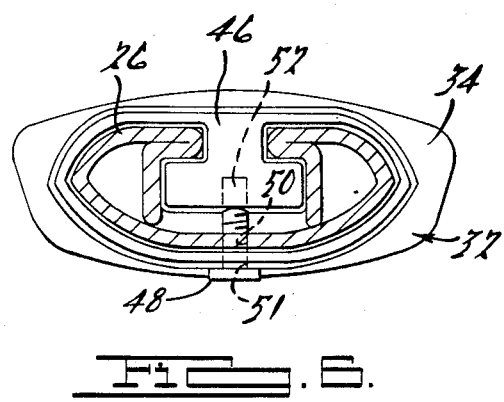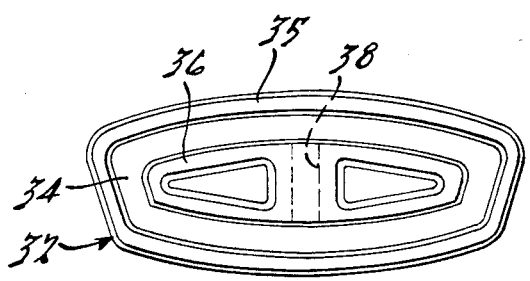

VEHICLE LUGGAGE CARRIER

BACKGROUND AND SUMMARY OF THE INVENTION

Conventional luggage carriers having two pairs of support stanchions and having elevated side rails supported between each pair of luggage rack support stanchions have been known and used for some time on automotive vehicles since applicant conceived of the invention embodied in U.S. Pat. Nos. 26,538 and 26,539, issued Mar. 4, 1969. Such conventional luggage carriers also employed at least one cross rail member extending across the car roof from either the support stanchions or from the elevated side rails, or both. Modifications to the support stanchions to allow them to incorporate new versions of cross rail members has also been performed over the years, such as that shown in applicant's U.S. Pat. Nos. 4,175,682 and 4,342,411.

The present invention improves the support stanchions of such a luggage carrier to utilize a die cast plastic or metal member which is compatible with any currently available cross rail having a capacity to be modified readily in engage potential cross rail cross section designs in the future and also may conceal any fasteners securing the support member to the stanchion and the stanchion to the vehicle roof from view by the design of the stanchion.

It is accordingly a general object of the present invention to provide a new and improved vehicle luggage carrier. It is a more particular object of the present invention to provide a new and improved luggage carrier wherein the support means for the transversely extending cross rail member may be modified independently of the associated stanchion members.

It is yet another object of the present invention to provide a new and improved luggage carrier of the above character wherein the connecting means for the support member for any cross rail may be connected to the stanchion in a manner that conceals any fasteners used in the connecting process. The present invention may also include a design which conceals fasteners which secure each stanchion to the vehicle.

It is still a further object of the present invention to provide a new and improved luggage carrier, as above described, which has an aesthetically pleasing appearance, is of a durable construction, and will have a long and effective operational life.

Other objects and advantages of the present invention will be apparent from the following detailed description taken in conjunction with the accompany drawings.

BRIEF DESCRIPTION OF THE DRAWINGS

FIG. 3 is a truncated side elevational view of one side of the luggage carrier of the present invention viewed in the direction of arrow 3 in FIG. 1;

FIG. 4 is a vertical cross sectional view of the interface between the support member and the stanchion along lines 4—4 of FIG. 3;

FIG. 5 is an elevated sectional view along lines 5—5 of FIG. 3;

FIG. 6 is an elevated sectional view of the assembled interface between the cross member and the support member of FIG. 3; and FIG. 7 is an elevated view of the portion of the support member which interfaces with the stanchion.

DETAILED DESCRIPTION OF THE PREFERRED EMBODIMENTS

Figure 1:
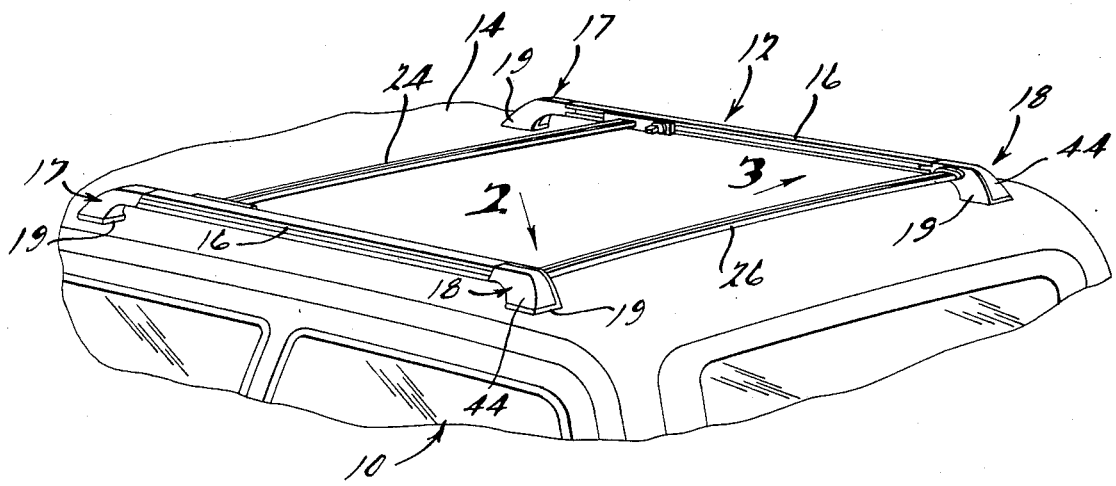
FIG. 1 is a perspective view of the upper portion of a vehicle body having a luggage carrier of the present invention secured to the roof thereof.
Figure 2:
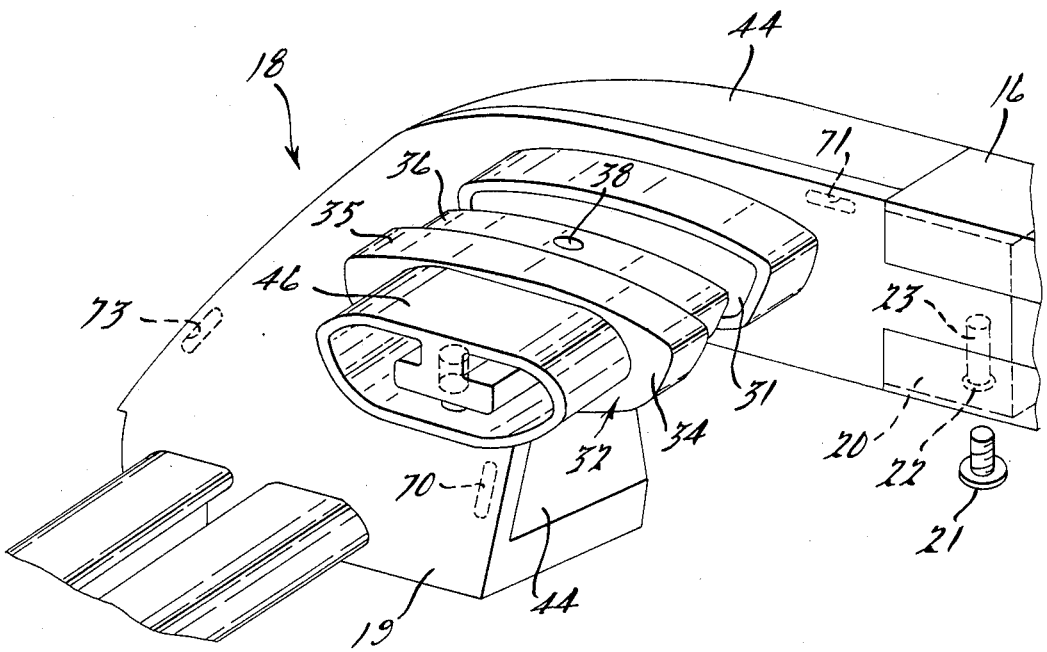
FIG. 2 is an exploided perspective view of one corner (arrow 2) of the luggage carrier of FIG. 1.

Referring now to detail to the drawings, ans in particular FIG. 1 thereof, an automotive vehicle 10 is shown comprising a luggage rack 12 mounted on a horizontally extending surface of a roof portion 14, which luggage rack 12 is constructed in accordance with the principles of the present invention. In particular, the luggage rack 12 embodies a pair of roll formed, extruded, or otherwise fabricated tubular side rails 16 which are arranged in a spaced parallel relationship and extend longitudinally of the vehicle 10. The opposite ends of the side rails 16 are each supported upon a rear stanchion 17 and a forward stanchion 18. As shown in FIG. 2, the stanchions 17 and 18 each have a base section 19 which has an extended boss 20 which telescopically engages the end of a side rail 16. As shown in FIGS. 2 and 3, a threaded fastener 21 secures each respective stanchion and side rail together via a hole 22 in the side rail and a threaded bore 23 in the stanchion 17 or 18. A cross member 24 extends transversely between the side rails 16 at the rearward end of the vehicle and a cross member 26 extends between the stanchions at the forward end of the vehicle.

The rear cross member 24 is adjustably mounted in a manner similar to that construction disclosed in applicant's prior U.S. Pat. No. 4,133,465, issued Jan. 9, 1979, as illustrated in FIG. 5, with a mounting bracket 25, and clamping means comprising a manually engageable threaded element 27 and a clamping plate 28, which element 27 and plate 28 interact to releaseably lock the cross rail 24 in place along the length of a respective channel 30 in each of the side rails 16. The forward stanchions 18 each have an additional aperture 31 formed therein through which a support member 32 for the forward cross rail member 26 is telescopically engageable with the base section 19 of the stanchion 18. The base section 19 also has an extended flange 33 around the aperture 31. The support member 32 comprises a body section 34 and an elongated extended section 36 having a threaded bore 38 therein which mates with a screw fastener 40 disposed through a bore 42 of the base section 19 of the stanchion 18 to secure the support member 32 and stanchion 18 together. A collar portion 35 also extends from said body section 34 to encapsulate the extended flange 33 of the stanchion 18 when the support member 32 and the stanchion 18 are assembled together. The fastener 40 in turn is obscured from view by a cover 44 which is fit onto the stanchion 18 above the fastener 40, as described below, and conceals the interior of the base element 19 of the stanchion 18, including the fastener 40, from view.

Opposite the extended section 36 of the support member 32 is a boss portion 46 extending in the opposite direction and telescopically engageable with the cross member 26 both interiorly and exteriorly of the member 26. The cross section of the cross member 26 substantially determines the corresponding cross section of the support member boss portion 46 and will also substantially dictate the position of a screw fastener 48 which secures the cross member 26 to the support member 32 via a hole 50 in the cross member 26 and a hole 51 and a bore 52 in the boss portion 46 of the support member 32.

In accordance with the present invention, the opposite ends of the cross rail 26 are operably supported by means of a pair of support members 32 each of which includes a laterally extending boss portion 46 adapted to be telescopically received within the adjacent end of the cross rail 26. The opposite end of the support member 32 is telescopically received into the forward support stanchions 18, secured thereto by a suitable fastener 40 which is concealed from view by a cover 44. The side rails 16 are assembled onto the support stanchions 17 and 18 and the rear cross member 24 is operably associated between the elevated side rails 16.

The entire rack is secured to the roof portion 14 of the vehicle 10 by means of screws 54 which extend through downwardly directed openings 55 in the base element 19 of each of the stanchions 17 and 18 into Riv-Nut fasteners 56 set in holes 58 in the roof portion 14 of the vehicle 10. In the described embodiment, the cover 44 will also conceal the screws 54 from view. A pad 60 is disposed between each stanchion 17 or 18 and the roof portion 14 and includes appropriate apertures through which the bolts 54 may pass.

The cover 44 may be constructed of either the same material as the base element 19 or of a different material. As illustrated in FIGS. 2 and 4, the cover 44 is plastic and is snap fit or press fit into appropriate recesses 70, 71, 72, and 73 in the base element 19 via corresponding tabs 76, 77, 78, and 79 on the cover 44.

One particularly important feature of the present invention resides in the fact that the luggage rack will find universality of application and be amendable to be applicable to a variety of different automobile models and styles with respect to wind noise and other design considerations which dictate the configuration of a cross rail for a particular vehicle. A related advantage of the presented invention resides in the fact that the support members may be fabricated of a different material than the stanchions as desired, which the attendant design advantages of such a construction.

While it will be apparent that the preferred embodiments of the invention disclosed are well calculated to fulfill the objects above stated, it will be appreciated that the invention is susceptible to modification, variation and change, such as use of two fixed cross members or use of a forward adjustable cross member and a rearward fixed cross member, or other changes, without departing from the proper scope or fair meaning of the subjoined claims.

I claim:

1. A luggage rack for an automobile having a horizontally disposed exterior body surface, comprising a pair of side members, at least one stanchion located at one end of each of said side members, each of said stanchions having a portion adapted for telescopic engagement with the adjacent end of an associated side member, wherein said side members are elevated from said body surface and each of said stanchions include a planar portion for separating an interior chamber of each said stanchion from the exterior of each said stanchion, a horizontally extending flange substantially surrounding a horizontal aperture in said planar portion of each of said stanchions, and cover means comprising at least a part of one exterior surface of said stanchion;

at least one transversely extending elongated cross member;

means for supporting said cross member at each end of said cross member comprising a support having a first extended portion telescopically engageable with said cross member, a second extended portion telescopically engageable with said stanchion into said aperture, and a collar engageable with and substantially covering said extended flange of said stanchion; and means for fastening said support and said stanchion together on one side of said planar portion wherein said cover means conceals said means for fastening said support when said cross member supporting means is secured to said stanchion on the other side of said planar portion.

2. The invention as set forth in claim 1, wherein said first extended portion of said support comprises a tubular member having an external peripheral surface and said extended flange has an external peripheral surface and an internal peripheral surface having a generally elliptical profile, said support having an axis perpendicular to said side rails when secured to said stanchion.

3. The invention as set forth in claim 2, wherein said first extended portion has a taper disposed on said external peripheral surface.

4. The invention as set forth in claim 2, wherein said second extended portion has a taper disposed on said external peripheral surface.

5. The invention as set forth in claim 2, further comprising second means for securing each said stanchion to said body surface concealed by said cover means.

6. In a luggage rack for an automobile, a pair of elevated side rail members, at least one transversely extending cross member having a longitudinally extending axis of symmetry, a pair of stanchions located one at each end of said cross members with each of said stanchions being associated with one end of one of said side members, each of said stanchions having a laterally projecting portion adapted for telescopic engagement with the adjacent end of an associated side member, an aperture associated with said stanchion, wherein said stanchion has at least one interior surface and at least one exterior surface and said aperture communicates with said interior surface and said exterior surface, and cover means enclosing said interior surface of said stanchion at least adjacent said aperture;

each of said cross members having support means at each end thereof, including an extended portion insertable into said aperture; and fastener means securing said support means to said stanchion, including a fastener element aligned perpendicular to said axis of said cross member when each said cross member support means and one of said stanchions is fastened together.

7. A luggage rack for an automobile having a horizontally disposed exterior body surface, comprising a pair of side members, at least one stanchion located at one end of each of said side members, each of said stanchions having a portion adapted for telescopic engagement with the adjacent end of an associated side member, wherein said side members are elevated from said body surface and each of said stanchions include an aperture and removable cover means comprising at least a part of one exterior surface of said stanchion;

at least one transversely extending elongated cross member, including a line incorporated in the longitudinally extending portion thereof;

means for supporting said cross member at each end of said cross member comprising a support having a first extended portion telescopically engageable with said cross member, a second extended portion telescopically engageable with said stanchion into said aperture, and means for substantially covering said extended flange of said stanchion engageable with said extended flange; and means for fastening said support and said stanchion together interiorly of said stanchion, said fastening means comprising an elongated element aligned perpendicularly to said line of said cross member when said support and stanchion are fastened together, wherein said cover means conceals said means for fastening said support when said cross member supporting means is secured to said stanchion exteriorly of said stanchion and permits access to said means for fastening when removed.

* * * * *

UNITED STATES PATENT AND TRADEMARK OFFICE
CERTIFICATE OF CORRECTION

PATENT NO. : 4,673,119

DATED : June 16, 1987

INVENTOR(S) : John A. Bott

It is certified that error appears in the above-identified patent and that said Letters Patent is hereby corrected as shown below:

Column 1, line 11, after "U.S." insert --Reissue--

Column 1, line 25, "in" should be --to--

Column 1, line 53, "accompany" should be --accompanying--

Column 1, line 59, "exploided" should be --exploded--

Column 2, line 9, "ans" should be --and--

Column 2, line 37, "releaseably" should be --releasably--

Column 3, line 38, "presented" should be --present--

Column 3, line 40, "which" should be --with--

Signed and Sealed this

Twenty-fourth Day of November, 1987

Attest:

DONALD J. QUIGG

Attesting Officer

Commissioner of Patents and Trademarks